United States Patent [19]

Davis

[11] Patent Number: 4,547,140
[45] Date of Patent: Oct. 15, 1985

[54] ROTARY INJECTION MOLDING PRESS

[75] Inventor: Dhu Aine J. Davis, Bruceville, Ind.

[73] Assignee: Illinois Precision Corporation, Wheaton, Ill.

[21] Appl. No.: 482,019

[22] Filed: Apr. 4, 1983

[51] Int. Cl.[4] ............................................. B29F 1/00
[52] U.S. Cl. ................................... 425/138; 264/40.5; 425/150; 425/DIG. 45
[58] Field of Search ............... 425/135, 136, 138, 139, 425/151, 152, DIG. 45, DIG. 201, 150; 264/40.1, 40.5

[56] References Cited

U.S. PATENT DOCUMENTS

| 2,201,244 | 5/1940 | Root | 425/152 |
| 2,906,214 | 9/1959 | Frank | 425/139 |
| 3,877,859 | 4/1975 | Grazine | 425/152 |
| 4,421,467 | 12/1983 | Richmond | 425/150 |

FOREIGN PATENT DOCUMENTS

| 2520876 | 11/1976 | Fed. Rep. of Germany | 425/152 |
| 55173 | 4/1968 | Poland | 425/136 |

OTHER PUBLICATIONS

Illinois Precision Corporation brochure entitled for "Model TTM-H2".

Primary Examiner—Donald Czaja
Assistant Examiner—V. Fischbach
Attorney, Agent, or Firm—Wood, Dalton, Phillips, Mason & Rowe

[57] ABSTRACT

An improved rotary injection molding press for plastic parts of the type having a movable platform which indexes one or more manually opened and closed mold blocks to and from different stations on the press. Should an open mold block index from a preparation station to the index station where an injector mechanism injects fluid plastic into closed mold blocks, an actuator detects the open mold block to activate switch means to stop the press. Should a closed mold block index from a cooling station when the injected plastic cools in the mold block to an eject station which ejects the completed part from open mold blocks, a pin disposed in the mold block activates a switch to stop the press. Additionally a protective shroud is provided surrounding the injector mechanism to protect the press operator. Removal of the shroud activates a switch to stop the press.

5 Claims, 5 Drawing Figures

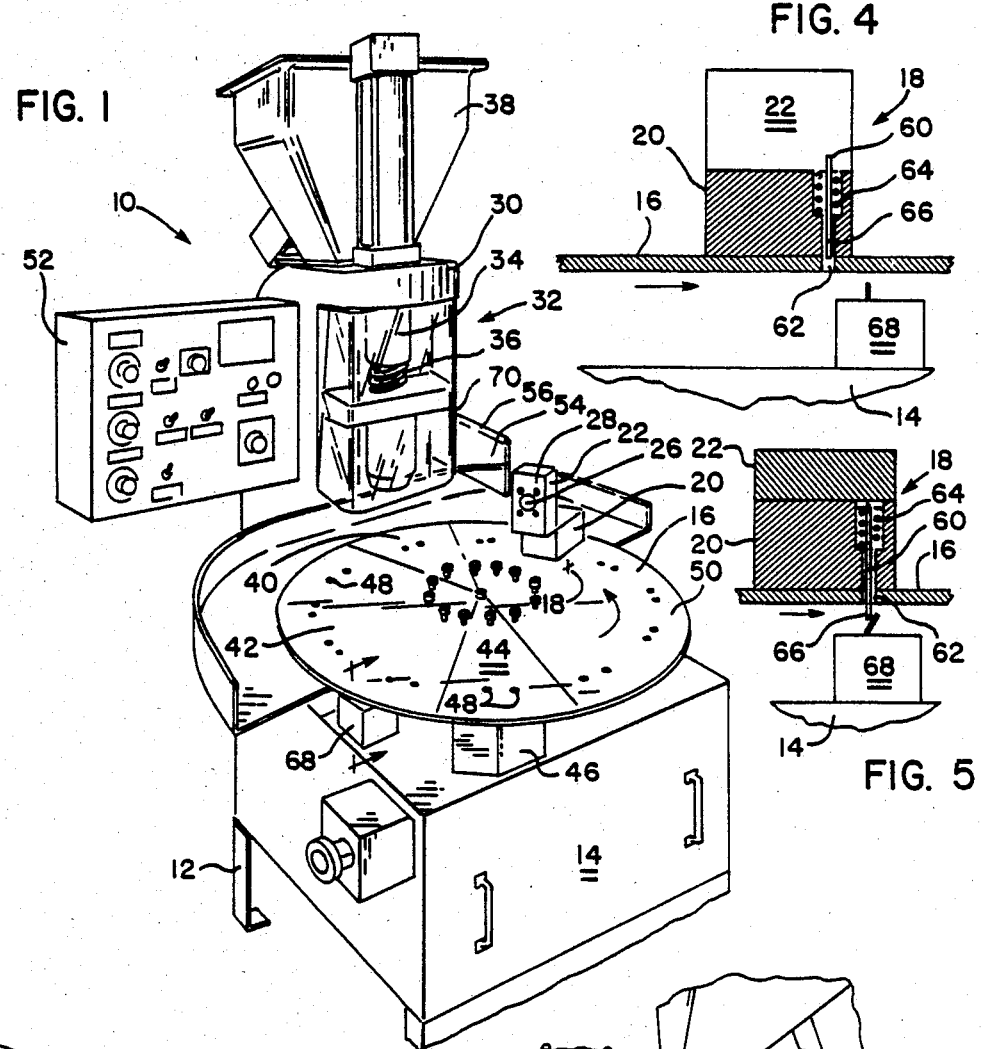
FIG. 1
FIG. 4
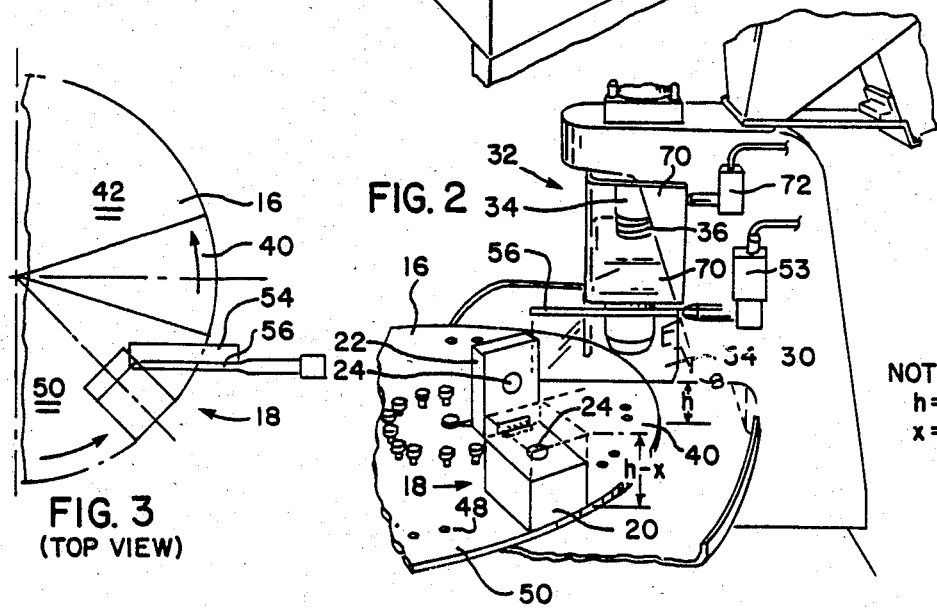
FIG. 5
FIG. 3 (TOP VIEW)
FIG. 2
NOTE:
h = Height
x = Clearance

ROTARY INJECTION MOLDING PRESS

BACKGROUND OF THE INVENTION

1. Field of the Invention

This invention relates to injection molding presses and more particularly to rotary injection molding presses which inject fluid plastic into a part forming mold.

2. Description of the Prior Art

In injection molding, molds are provided which have cavities to receive plastic heated to its fluid state. The plastic, as it cools, hardens and conforms to the cavity configuration resulting in the desired shaped plastic part. Components such as electrical wiring or the like are often positioned within a cavity so as to become embedded within the finished plastic part.

One known injection molding device to produce the aforesaid plastic parts is a rotary injection molding press. The press has a frame supporting a rotatable table which mounts one or more mold blocks. The mold blocks, designed and constructed for each particular configuration of plastic part, have a bottom secured to the table and a top. The top is hinged to the bottom to permit the mold block to open and to close to define the plastic receiving mold cavity. Typically, the mold cavity is fashioned in the mold block bottom with the top having a female opening to receive and admit fluid plastic into the cavity.

The rotary injection molding press also includes an injection mechanism which is fed with solid plastic, usually in pellet form, and which includes heating elements to heat the plastic to a fluid state. A piston-like plunger element housed within the injection mechanism is driven to force the fluid plastic under pressure through an injector nozzle into the cavity of a properly positioned mold block. Most of the aforesaid presses have a number of mold blocks secured to the platform so that plastic parts can be fashioned in a continuous manner.

In a typical prior art rotary injection molding press, the platform can be said to sequentially position one or more mold blocks at specific stations on the press. At the inject station, a closed mold block is positioned for engagement by the plunger and is injected with fluid plastic. After the mold block has been injected with fluid plastic, the platform is moved by indexing means to transport the mold block to a cooling station wherein the fluid plastic within the mold cavity is allowed to cool and harden to form the desired plastic part. Next, the platform moves to index the mold block to an eject station where the molded plastic part is removed from the mold block. Subsequent to the removal of the molded part from the mold block, the platform indexes to transport the mold back to and through a prep station where the mold block is again made ready to receive plastic as by position of electrical wiring or the like therein, and the mold block is closed.

One of the drawbacks of the injection of rotary molding press described above is that should a mold block be inadvertently left open as the platform moves to index the mold block to the inject station, the open mold block as it proceeds to the inject station can engage the plunger damaging either the mold block or the plunger or both. Furthermore, plastic injected toward an open mold block is not confined to the mold cavity. This results in the plastic spreading over the mold block, table and surrounding structure. The foregoing is costly since labor is required for clean-up and during the shutdown of the machine the desired parts are not being produced.

Another drawback focuses upon the inadvertent failure to open the mold block prior to the eject station of the press. In many presses hydraulic rams extend from beneath the platform, through the mold block bottom to eject the molded piece from the mold block. Accordingly, should the mold block top be left closed actuation of the hydraulic ram can damage either the piece, the mold block or the ram itself. Again, the foregoing is costly not only due to the repairs required and the machine down time but also due to the damaged piece which must be scrapped.

A further drawback is that in many injection molding presses, the plunger and its movement are exposed. An inattentive operator is susceptible to injury should a portion of his body be placed in the path of the plunger. Furthermore, the heating elements, while somewhat shielded within the plunger mechanism, do produce elevated temperatures sufficient to burn the operator. Protective shrouds have been provided. However, to view the operation of the plunger many of the operators often remove and discard the protective shroud exposing themselves to risk of personal injury.

SUMMARY OF THE INVENTION

It is an object of the present invention to overcome one or more of the drawbacks of rotary injection molding presses set forth above.

Toward this end, the improved rotary injection molding press of the present invention has sensing and switch means to determine whether an open mold block is being indexed toward the plunger and if so, to shut down the machine before damage to either the mold block or the plunger can be occasioned or plastic can be improperly dispensed toward the open mold block. In another aspect of the present invention, the improved rotary injection molding press includes sensing and switch means to determine whether a closed mold block is being indexed toward the piece eject station and, if so, to shut down the press to avoid damage to the piece, mold block or the hydraulic ram. In yet another aspect of the present invention, a transparent shroud is disposed on the press to surround the plunger, removal of the shroud actuating a switch to shut down the press thereby protecting the operator from injury by the plunger.

Accordingly, the improved rotary injection molding press of the present invention has sensing means suspended over the platform between the prep and inject stations. The sensing means are preferably embodied as a paddle-like element supported on the press frame for pivotal motion in the direction of mold block travel. While a closed mold block may pass beneath the sensing means, should an open mold block approach the inject station, the mold block top engages the sensing means which, in turn, actuates a switch to shut down the machine. The operator thereafter can close the mold block and restart the machine avoiding damage to either the machine, mold block or the improper dispense of plastic to an open mold block.

Another feature of the improved injection molding press of the present invention is a closed mold block sensing means to determine if a closed mold block is being indexed to the eject station. The closed mold block sensing means preferably is embodied as a spring loaded pin positioned within the mold block. When the mold block is closed the pin extends from the mold block through and to a position beneath the platform. When the mold block is open the pin is retracted into the mold block. Positioned beneath the platform is a switch activated by the extended pin. Accordingly, should a closed mold block be indexed toward the eject station the pin will engage the switch means and the machine will be shut down thereby protecting the piece, mold block and hydraulic ram from damage.

A further feature of the improved rotary injection molding press of the present invention is a transparent shroud surrounding the plunger, the shroud operatively connected to a switch activated by removal of the shroud to shut down the press.

Accordingly, it is an object of the present invention to prevent damage to the mold block, plunger and prevent the time consuming cleanup resulting in injection of plastic into an open mold block. The open mold block sensing and switch provides a reliable and inexpensive mechanism to accomplish the aforesaid object.

It is a further object of the present invention to protect the mold block, the molded plastic piece and the hydraulic ram from damage by providing sensing and switch means to shut down the machine should a closed mold block be indexed to the eject station for ejection of the plastic part. This in turn avoids costly repairs to the machine or damage of molded parts.

It is yet another object of the present invention to protect the operator of the press from injury by the plunger or related mechanisms. Removal of the shroud is frustrated since such removal will shut down the press.

Further objects and advantages will become apparent upon a reading of the specification, drawings and claims.

BRIEF DESCRIPTION OF THE DRAWINGS

FIG. 1 is a perspective front view of the improved injection molding press of the present invention;

FIG. 2 is an perspective side view of the molding press of the present invention illustrating the table, mold block and injector mechanism;

FIG. 3 is a schematic top view of the press table showing an open mold block as it engages sensing means;

FIG. 4 is a section view of a mold block in the open position and a portion of the table; and FIG. 5 is a section view similar to that of FIG. 4 showing the mold block in the closed position.

DESCRIPTION

Turning to the drawings, FIG. 1 illustrates a rotary injection molding press 10 of the present invention. The press 10 has an upstanding frame 12, a portion of which defines a lower, and frontally extending cabinet 14 to house the hydraulics and electronics of the press 10.

Disposed on the press 10 is a movable platform embodied as a circular table 16. As FIG. 1 illustrates, the table 16 is rotatable in a counterclockwise direction, however, it is to be understood that the present invention is equally applicable to other types of presses having different configurations of platforms and different modes and directions of platform travel.

The table 16 mounts one or more mold blocks 18, only one of which is shown in the drawings, and transports each mold block 18 through several stations of the press 10 described in detail below.

As seen in FIGS. 1 and 2, each mold block 18 has a bottom 20 secured to the table 16 by a clamp or the like (not shown) and a top 22 hinged to the bottom 20 for pivoting opening and closing movement. When the mold block 18 is open, the top 22 extends upwardly from the bottom 20. Fashioned in the mold block 18 in either the bottom 20, top 22 or cooperatively in both the bottom 20 and top, 22 is a mold cavity 24 adapted to be filled with fluid plastic and form the desired finished plastid part. As shown in FIG. 1, the top 22 has a female opening 26 which directly communicates with the cavity 24 and aligning bores 28 the purposes of which will hereinafter be described.

To fill the mold block cavity 24 with fluid plastic, the press frame 12 has an upstanding support 30 mounting an injector mechanism 32. The injector mechanism 32 includes a piston-like plunger 34 hydraulically driven to move downward toward the table 16 against the upward, returning bias provided by coil spring 36. Housed within the injector mechanism 32 adjacent to the plunger 34 are heating elements (not shown) which receive solid plastic usually in pellet form from a bin 38 disposed above the heating elements and heat the solid plastic to a fluid state.

Disposed at the lower end of the plunger 34 as seen in FIG. 1 is an injection nozzle (not shown) which is adapted to mate with the female opening 26 of the mold block top 22. Aligning pegs (not shown) surrounding the nozzle register with the bores 28 to assure proper alignment of the nozzle with the female opening 26.

To inject plastic into a mold block 18, the plastic is heated by the heating elements to a fluid state. Thereafter the plunger is driven downward such that the nozzle registers with the female opening 26 of the closed mold block 18. Further downward movement of the plunger injects the fluid plastic through the nozzle to fill the cavity 24. After injection, the plunger 34 is returned by the spring 36 and additional plastic pellets are admitted to the heating elements.

To transport the mold blocks 18 to and from the injector mechanism 32, the press 10 includes table indexing means disposed substantially in the cabinet 14 and controlled from a control center 52 mounted to support 30. The indexing means sequentially rotates the table 16 to move the mold blocks 18 through four stations of the press 10 as schematically shown in FIG. 1. At a portion of the press 10 defining a inject station 40, the mold block 18, when closed, is aligned with the plunger 34 of the injector mechanism 32 for injection of liquid plastic into the cavity 24 thereof. At this point it should be noted that the operation of the injector mechanism 32, also controlled at center 52, coordinates with the indexing means to inject a mold block 18 when it has been indexed to the inject station 40. Accordingly, the indexing of mold blocks to the inject station 40 and the filling of the mold block cavities 24 is virtually automatic.

After the injection mechanism 32 has filled the mold block cavity 24, the table 16 is indexed by the indexing means in a counterclockwise fashion as shown in FIG. 1 to transport the closed mold block 18 to a cooling station 42 as another mold block 18 is positioned in the inject station 40 for injection of plastic. As the mold block 18 progresses through the cooling station 42, the liquid plastic within the cavity 24 of the mold block 18 solidifies to form the desired plastic part. At or near the end of the cooling station 42, the mold block 18 is manually opened to expose the molded part for removal.

Continuing to index, the table 16 transports the mold block 18 to an eject station 44 where ejection means urge the molded plastic part from the open mold block 18. As shown in FIG. 1, the ejection means are schematically shown as a hydraulic ram unit 46. The ram unit 46 is adapted to extend a pair of fingers (not shown) through holes 48 in the table 16 into the mold block 18 to force the completed plastic part therefrom.

As the table 16 continues to be rotated by the indexing means the open mold block 18 enters prep station 50 wherein the mold block 18 is made ready for injection of plastic such as, for example, by positioning electric parts which will be embedded in the completed plastic part within the cavity 24. After preparation of the mold block 18 for re-injection of plastic, the mold block 18 is manually closed. The indexing means continues to rotate the table 16 and the closed mold block 18 re-enters the inject station 40 for injection of plastic by the injector mechanism 22.

As can be appreciated from the foregoing, the mold blocks 18 must be manually closed in the prep station 50 prior to their transportation to the inject station 40. Should the mold block 18 be open, the top 22, as shown in FIG. 2, may engage the injector mechanism 32 damaging either the mold block 18 or the injector mechanism 32. Furthermore, should the mold block 18 index to the inject station 40 while in the open position, plastic dispensed from the injector mechanism 32, usually at elevated pressures, will not be confined with the cavity 24 but will, instead, spread over the mold block bottom 20, table 16 and surrounding portions of the press 10.

To prevent an open mold block 18 from indexing from the prep station 50 to the inject station 40, the press 10 includes sensing means disposed above the table 16 to sense the progression of an open mold block 18 into the inject station 40. As shown in FIGS. 1-3, the sensing means is preferably embodied as a paddle-type actuator 54. The actuator 54 has a blade 55 mounted to an offset shaft 56. The shaft 56 is, in turn, mounted to the support 30 so as to suspend the blade 55 a height h over the table 16 and to permit the actuator blade 55 to pivot in the direction of mold block travel. The shaft 56 is operatively connected to switch means embodied as switch 58 attached to the support 30 of the press 10.

Viewing FIGS. 1-3, it is to be understood that the mold block 18 in a closed position projects a height x (FIG. 2) above the surface of the table 16. To allow the closed mold block 18 to pass beneath the actuator blade 55 a clearance defined by h−x is provided between the lowermost portion of the blade 55 and the top of the closed mold block 18. As the closed mold block 18 is indexed from the prep station 50 to the inject station 40, the mold block 18 passes beneath the blade 55 due to the aforesaid clearance provided therebetween. However, when the mold block 18 is in the open position, the upstanding top 22 projects to a height above the table 16 greater than the height h defining the lowermost portion of the blade 55. Accordingly, should an open mold block 18 index from the prep station 50 toward the inject station 40, the top 22 engages and pivots the actuator 54, the pivoting motion activating the switch 58 to shut down the press 10. This, in turn, prevents an open mold block 18 from coming into damaging contact with the injection mechanism 32 or becoming positioned in the inject station 40 for improper injection of plastic to the mold block 18.

To prevent a closed mold block 18 from indexing from the cooling station 42 to the eject station 44, which may result in damage to the mold block 18, ram unit 46, or the molded piece, the mold block 18 is provided with closed mold block sensing means embodied as a pin 60 as substantially shown in FIGS. 5 and 6.

The pin 60 is housed within the mold block 18 to slide vertically through the mold block bottom 20 and through a cooperative bore 62 in the table 16. When the mold block 18 is in the open position as illustrated in FIG. 5, the pin 60 is urged to a raised position by a spring 64 such that the pin 60 projects above the mold block bottom 20 and the pin lower end 66 is retracted into the mold block bottom 20. When the mold block 18 is closed, the top 22 engages the pin 60 to displace the pin 60 downward against the bias by the spring 64 to a position wherein the pin lower end 66 extends through the bore 62 and beneath the table 16. Accordingly, opening and closing of the mold block 18 moves the pin 60, respectively, to retract the pin lower end 66 into the mold block 18 and extend the lower end 66 beneath the table 16.

Disposed beneath the table 16 and mounted on the cabinet 14 to shut down the press 10 if a closed mold block 18 is indexed to the eject station 44 are switch means embodied as a toggle switch 68. The toggle switch 68 is located substantially at the cooling station 42 of the press 10 near the eject station 44. As shown in FIG. 6, when the mold block 18 is closed and is indexed from the cooling station 42 to the eject station 44, the pin lower end 66 is extended beneath the table 16 to activate the toggle switch 68 to shut down the press 10 before the closed mold block 18 can be positioned at the eject station 44. Accordingly, the indexing of a closed mold block 18 from the cooling station 42 to the eject station 44 is prevented. This, in turn, protects the mold block 18, ram unit 46 or molded plastic piece from damage. To restart the press 10, the operator merely opens the mold block 18 and pushes the starter button located at the control center 52. As seen in FIG. 5, when an open mold block 18 is indexed from the cooling station 42 to the eject station 44, the pin 60 is retracted whereby its lower end 66 freely passes over and does not actuate the toggle switch 68.

To protect the operator from being injured by the injection mechanism 32 and more particularly its plunger or heating elements, a transparent shroud 70 is secured to the support 30 to surround the exposed portions of the injection mechanism 32. Preferably the shroud 70 is fashioned from a clear plastic material.

As stated above, operators often feel free to remove protective devices such as the shroud 70 surrounding the injection mechanism 32. To prevent the press 10 from operating without the protective shroud 70, switch means, shown as a shroud switch 72 secured to the support 30, are provided. The shroud switch 72 is typically of a type having a finger 74 which is depressed when the shroud 70 is secured in place on the support 30. Should the shroud 70 be removed, the finger 74 of the shroud switch 72 extends and shuts down the press 10 thereby preventing operation without the protective shroud 70 being in place. This in turn protects an operator from being injured by the injection mechanism.

While I have shown and described certain embodiments of the present invention, it is to be understood that it is subject to many modifications without departing from the scope and spirit of the invention set forth in the specification, drawings and claims.

I claim:

1. In a press for injection molding of plastic parts of the type having a frame, a movable platform disposed on said frame, at least one mold block having a bottom secured to said platform and an opening and closing hinged top, an injection mechanism adapted to inject liquid plastic into said mold block when closed, and indexing means to move said platform and transport the mold block to an inject station wherein the injection mechanism injects plastic into the mold from a prep station wherein the mold block is prepared for injection of plastic, and to an eject station where a molded plastic element is removed from the mold prior to return of the mold to the prep station, the improvement comprising:

a first actuator disposed on said press exteriorly of said mold block to engage the hinged top of an open mold block moved by said indexing means to said inject station from said prep station;

first switch means activated by said actuator upon said actuator engaging the hinged top of an open mold block, said switch means stopping said press to prevent said open mold block from moving to said inject station;

a second actuator disposed within said bottom of the mold block to be engaged by the hinged top of a closed mold block moved by said indexing means to said eject station from said inject station; and second switch means activated by said second actuator upon said second actuator engaging the hinged top of a closed mold block, said second switch means stopping said press to prevent said closed mold block from moving to said eject station.

2. The press of claim 1 wherein said first actuator includes a rotatable shaft mounting a blade, said blade spaced from said table a distance sufficient to pass a closed mold block, said blade engaged by the hinged top of an open mold block to rotate said shaft and activate said switch means.

3. In a press for injection molding of a plastic part of the type having a frame, a platform movably disposed on said frame, at least one selectively opening and closing mold block having a bottom secured to said platform and a top hingedly mounted to said bottom, injection means adapted to engage and inject liquid plastic into said mold block when closed to form said part, ejection means to eject said molded part from said mold block when open and indexing means to move said platform and transport the mold block from an inject station wherein said injection means injects plastic into said closed mold block to an eject station wherein said ejection means removes said part from said mold block when open, the improvement comprising:

a pin longitudinally movably carried in the mold block bottom and having one end disposed to be engaged by the mold block top and cause the opposite end to extend from said mold block when the mold block is closed;

biasing means for causing said opposite end to retract into said mold block bottom when said mold block is opened; and switch means activated by said pin when so extended to shut down said press and protect said part and mold block against said ejection means encountering a closed mold block, said switch means being disposed between said inject station and said eject station.

4. The press of claim 3 wherein said pin one end is urged by said biasing means to extend from said mold block bottom to be engaged by said mold block top when the mold block is closed.

5. The press of claim 4 wherein said biasing means comprises a spring disposed within said mold block bottom.

* * * * *